(12) United States Patent
Fukada et al.

(10) Patent No.: US 8,703,279 B2
(45) Date of Patent: Apr. 22, 2014

(54) DECORATED MOLDED ARTICLE AND METHOD FOR PRODUCING THE SAME

(75) Inventors: Yasuhide Fukada, Kyoto (JP); Kumiko Yoshikawa, Kyoto (JP); Nobuyasu Hirobe, Kyoto (JP); Shigeru Hinoshita, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 1439 days.

(21) Appl. No.: 11/791,112

(22) PCT Filed: Nov. 18, 2005

(86) PCT No.: PCT/JP2005/021202
§ 371 (c)(1),
(2), (4) Date: Nov. 5, 2007

(87) PCT Pub. No.: WO2006/057198
PCT Pub. Date: Jun. 1, 2006

(65) Prior Publication Data
US 2008/0191386 A1    Aug. 14, 2008

(30) Foreign Application Priority Data

Nov. 25, 2004  (JP) .................................. 2004-340450
Nov. 25, 2004  (JP) .................................. 2004-340451

(51) Int. Cl.
B29C 45/14    (2006.01)

(52) U.S. Cl.
USPC ..................... 428/201; 428/195.1; 428/542.2; 264/275

(58) Field of Classification Search
USPC ........... 428/542.6, 195.1, 201, 542.2; 40/615; 264/275
See application file for complete search history.

(56) References Cited

U.S. PATENT DOCUMENTS 4,965,037 A      10/1990  Weaver et al.
6,490,819 B1 *  12/2002  Kumata et al. .................. 40/615

FOREIGN PATENT DOCUMENTS

| CN | 1048814 A | | 1/1991 |
| JP | 05104695 A | | 4/1993 |
| JP | 06182937 A | * | 5/1994 |
| JP | 7-23280 Y2 | | 5/1995 |
| JP | 07-023280 Y2 | * | 5/1995 |
| JP | 10-86176 A | | 4/1998 |
| JP | 2001-150624 A | | 6/2001 |
| JP | 2004-276415 A | * | 10/2004 |

OTHER PUBLICATIONS

Japanese Office Action dated Feb. 6, 2009, issued in corresponding Japanese Patent Application No. 2005800402973.
International Search Report of PCT/JP2005/021202, date of mailing Feb. 14, 2006.

* cited by examiner

Primary Examiner — Mark Ruthkosky
Assistant Examiner — Christopher Polley
(74) Attorney, Agent, or Firm — Westerman, Hattori, Daniels & Adrian, LLP

(57) ABSTRACT

Decorated molded article creating a three-dimensional appearance is provided. A decorated molded article 1 has a transparent layer 51 arranged on the front side thereof. A projection layer 11 is arranged partly on the front side of the transparent resin layer 51. A screen layer 31 is formed on the back side of the transparent layer 51. An image projected from the projection layer 11 is produced on the screen layer 31. When the decorated molded article 1 is observed from obliquely above, the projection layer 11 and an image 17 are visually recognized simultaneously. Therefore, the projection layer 11 is recognized as if it were three-dimensional.

6 Claims, 4 Drawing Sheets

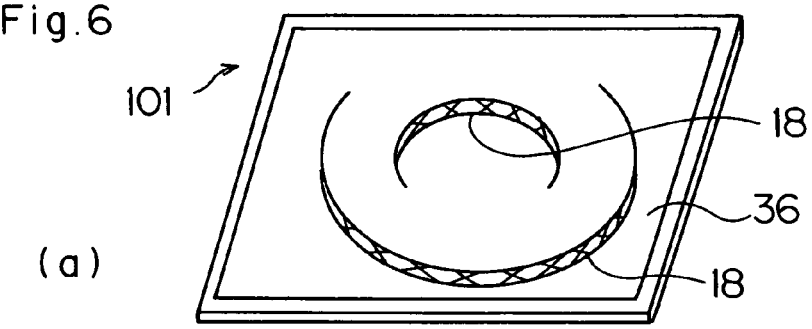
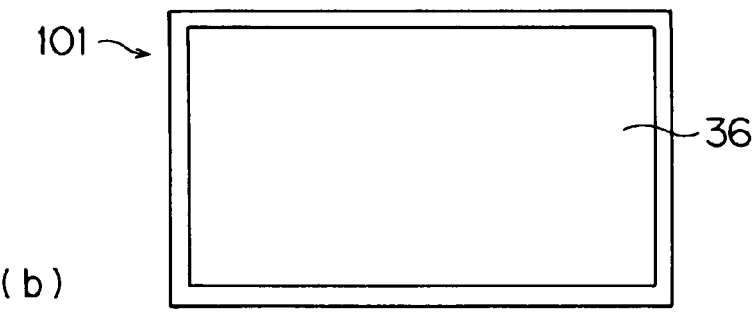
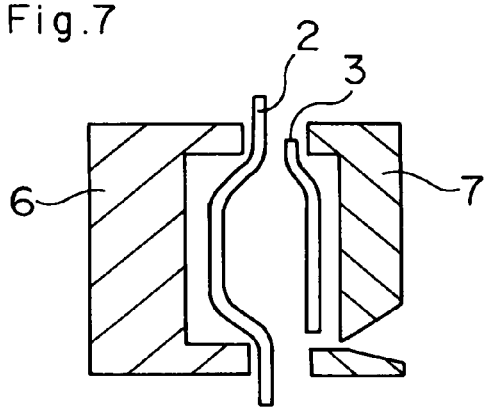
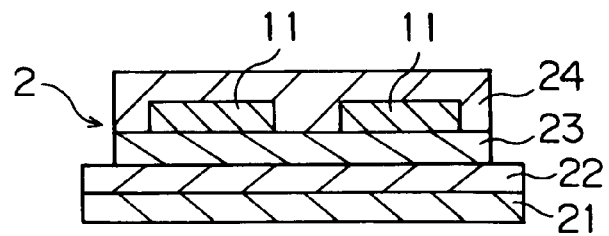

DECORATED MOLDED ARTICLE AND METHOD FOR PRODUCING THE SAME

TECHNICAL FIELD

The present invention relates to a decorated molded article that is decorated. More specifically, the present invention relates to a decorated molded resin article creating a three-dimensional appearance.

BACKGROUND ART

Conventionally, a molded resin article for creating a three-dimensional appearance has a printing layer comprising characters on the back side of a transparent resin layer (refer to the patent document 1, for instance). Conventionally, a injection-molded article for creating a three-dimensional appearance has a transparent resin layer on the whole front side of which a gradation printing layer of transparent print or watermark is formed and on the back side of which a metallic vapor deposition layer is formed (refer to the patent document 2, for instance).

Patent document 1: Japanese Patent Laid-Open No. 2000-254938 FIG. 7
Patent document 2: Japanese Patent Laid-Open No. 6-99458 Paragraph 0024

DISCLOSURE OF THE INVENTION

Problems to be Solved by the Invention

A molded resin article described in the patent document 1 looks good, because characters on the front side thereof is apparently embossed thanks to the thickness (distance) of the transparent layer; however, the molded resin article is a long way from creating a good three-dimensional appearance. The injection-molded article described in the Patent document 2 has an appearance showing such sense of brightness that jewelry has; however, the injection-molded article is a long way from creating a good three-dimensional appearance.

Therefore, it is an object of the present invention to provide a decorated molded article creating a three-dimensional appearance of a molded resin article, a injection-molded article and the like. Another object of the present invention is to provide a method for producing such decorated molded article. Other objects of the present invention will become apparent from the detailed description of the present invention to follow.

Method to Achieve the Objects

A decorated molded article in accordance with one embodiment of the present invention comprises:
a transparent resin layer,
a projection layer partly arranged on a front side of said transparent resin layer, and
a screen layer that is arranged on an area intended to be decorated of the back side of said transparent resin layer and on which an image projected from said projection layer is produced.

The decorated molded article of the present invention forms an image of the projection layer on the screen layer, which image is visually observed by a viewer from a space between the projection layers, and consequently creates a three-dimensional appearance.

In the present invention, the transparent resin layer may be either a colorless transparent resin layer or a colored transparent resin layer. In the present invention, the screen layer, which is formed on an area intended to be decorated, may not necessary be formed on the whole back side of the decorated molded article. Likewise, the transparent resin layer may not necessary be formed on the whole area of the decorated molded article.

In one preferred embodiment of the decorated molded article of the present invention, said transparent resin layer may have a thickness of equal to or more than 0.5 mm.

When the decorated molded article of the present invention is observed from the same direction as the angle between the surface of the decorated molded article and the visual line, the width of an image observed becomes wider as the transparent resin layer formed on the decorated molded article becomes thicker. In this preferred embodiment, the transparent resin layer has a thickness of more than a certain value, which broadens the width of the image observed, and therefore, more three-dimensional appearance is created.

In one preferred embodiment of the decorated molded article of the present invention, a surface facing said transparent resin layer of said screen layer may have a specular glossiness Gs (60°) of equal to or more than 80 according to JIS-Z8741.

In this preferred embodiment, an image produced on the screen layer becomes clearer so that more three-dimensional appearance can be obtained. However, in the decorated molded article of the present invention, a surface facing the transparent resin layer of the screen layer may have a specular glossiness Gs (60°) of less than 80 according to JIS-Z8741. Such decorated molded article, where a faint image is observed, creates a delicate three-dimensional appearance.

In one preferred embodiment of the decorated molded article of the present invention, said transparent resin layer may have a light transmission of equal to or more than 80%, and said projection layer may be composed of a material containing equal to or more than 1 or more part by weight of pigment for 100 parts by weight of binder.

In this preferred embodiment, an image produced on the screen layer becomes clearer, therefore, there is obtained more three-dimensional appearance.

In one preferred embodiment of the decorated molded article of the present invention, said screen layer may be composed of a metal film or a mixture of high-intensity pigment and binder resin.

In this preferred embodiment, an image produced on the screen layer becomes clearer, therefore, there is obtained more three-dimensional appearance. High-intensity pigments mean polarized flake pigments, pearl pigments and the like. Binder resin means resin contained in ink and paint, such as acryl-based resin, urethane-based resin, polyester-based resin, epoxy-based resin, vinyl-based resin, nitrocelluloser-based resin, and chlorinated rubber-based resin.

In another preferred embodiment of the decorated molded article of the present invention, the decorated molded article may have a cover layer an outline of which overlaps with an outline of said projection layer or is positioned outside the outline of said projection layer, and said cover layer covers said projection layer and takes on the same color on the area covered by said cover layer as color of the surrounding area.

In this preferred embodiment, when the front side of the decorated molded article is observed from directly above, no pattern is observed, because the cover layer and the screen layer are visually recognized in an integrated form; however, when observed from obliquely above, an image of the projection layer is observed on the screen layer. Consequently, the decorated molded article of the present invention becomes a decorated molded article having so novel design that a three-dimensional appearance visually observed becomes clear or disappears, depending on the observation angle.

In this preferred embodiment, "color of the surrounding area" means a color of the screen layer observed through the transparent resin layer in the state that the transparent resin layer is piled on the screen layer. In the case that the transparent resin layer is composed of colorless transparent resin, "color of the surrounding area", in general, is a color of the screen layer. In the case that the transparent resin layer is composed of colorless transparent resin, as a method for forming said cover layer, there is formation of the cover layer and the screen layer using the same material.

In another preferred embodiment of the decorated molded article of the present invention, the decorated molded article may have a cover layer a outline of which overlaps with an outline of said projection layer, and said cover layer, the color of which mixed with the color of said projection layer, takes on the same color on the area covered by said cover layer as color of the surrounding area.

In this preferred embodiment, when the front side of the decorated molded article is observed from directly above, no pattern is observed, because the cover layer and the screen layer are visually recognized in an integrated form; however, when observed from obliquely above, an image of the projection layer is observed on the screen layer. Consequently, the decorated molded article of the present invention becomes a decorated molded article having so novel design that a three-dimensional appearance visually recognized becomes clear or disappears, depending on the observation angle.

In this preferred embodiment, "color of the surrounding area" means a color of the screen layer observed through the transparent resin layer in a state that the transparent resin layer is piled on the screen layer. In this preferred embodiment, it is not necessary for the cover layer to shield the projection layer. A color observed from the side of the cover layer in a state that the cover layer and the projection layer are piled may be the same as the color of the surrounding area because of the color of the cover layer being mixed with the color of the projection layer.

In another preferred embodiment of the decorated molded article of the present invention, said transparent resin layer may be a colored and transparent resin layer.

According to this preferred embodiment, in addition to creating of a three-dimensional appearance, the visual observation area can be colored to obtain a decorated molded article having a much newer design. In this preferred embodiment, as a method for forming a cover layer taking on the same color as that of the surrounding, there is arrangement of a colored transparent resin composed of the same material as used for the colored transparent resin layer, in a pile on the cover layer. Furthermore, as another method for forming said cover layer, there is tinting of the cover layer with the same color as that of the surrounding by adjusting the color of the cover layer itself.

The method for producing a decorated molded article according to another embodiment of the present invention has a characteristic that a first decorated sheet having a projection layer partly arranged on a substrate sheet is arranged on an A mold's side, a second decorated sheet having a screen layer formed on the substrate sheet is arranged on a B mold's side, the A mold and the B mold are clamped, and molten resin, which becomes a transparent layer after being solidified, is injected, and then, the molded article is cooled and solidified, and the molds are opened to take out the decorated molded article according to the present invention.

In this embodiment of the present invention, the first decorated sheet and/or the second decorated sheet include a transfer sheet and an insert sheet.

The method for producing a decorated molded article according to another embodiment of the present invention has a characteristic that a third decorated sheet having a cover layer partly arranged on a substrate sheet and a projection layer formed in a pile on the upper surface of said cover layer is arranged on an A mold's side, a fourth decorated sheet having a screen layer formed on the substrate sheet is arranged on a B mold's side, the A mold and the B mold are clamped, and molten resin, which becomes a transparent resin layer after being solidified, is injected, and then, the molded article is cooled and solidified, and the molds are opened to obtain the decorated molded article according to the preferred embodiment of the present invention.

In this embodiment of the present invention, the third decorated sheet and/or the fourth decorated sheet include a transfer sheet and an insert sheet.

Combinations may be made to the extent possible in one embodiment of the present inventions, the preferred embodiments of the present invention, and the elements contained therein described above.

Effect of the Invention

The decorated molded article of the present invention has a transparent resin layer on the front side of which a projection layer is partly arranged and formed and on the back side of which a screen layer is formed, an image of the projection layer being projected to the screen layer and visually recognized by an viewer from a space (the transparent resin layer) between the projection layers. Consequently, the decorated molded article of the present invention can be visually recognized in three dimensions.

The method for producing the decorated molded article of the present invention has an advantage of producing a decorated molded article creating a three-dimensional appearance by practicing almost the same means as conventional ones for molding decorated articles simultaneously on both sides.

BRIEF DESCRIPTION OF THE DRAWINGS

FIG. 6 is an external diagrammatic sketch of the decorated molded article 101. FIG. 6(a) is an external diagrammatic sketch showing how the decorated molded article 101 is seen from obliquely above. FIG. 6(b) is an external diagrammatic sketch showing how the decorated molded article 101 is seen from directly above.

FIG. 7 is a sectional view showing an example of a mold used for producing of the decorated molded article 1 of the present invention.

FIG. 8 is a sectional view showing the first decorated sheet 2.

DESCRIPTION OF THE REFERENCE NUMERAL

Figure 1:
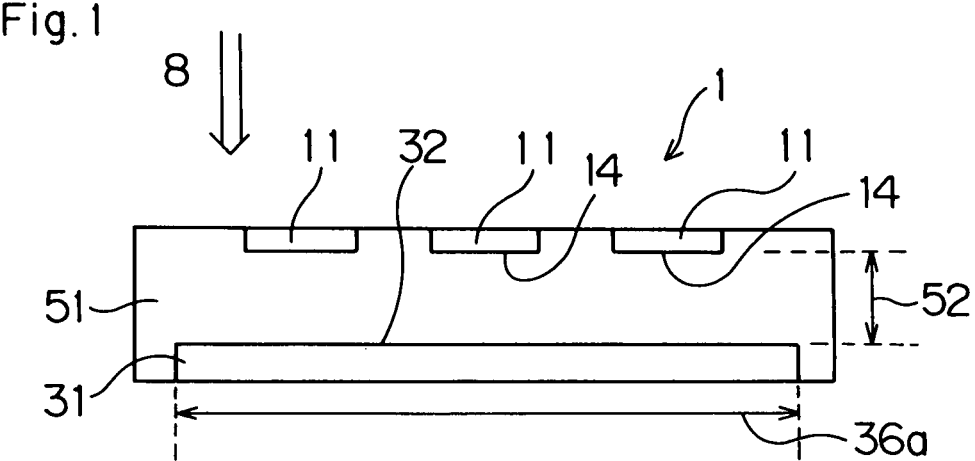
FIG. 1 is a partial sectional view showing a decorated molded article 1 according to an example of the present invention.

1 Decorated molded article
2 First decorated sheet
3 Second decorated sheet
4 A mold
7 B mold
11 Projection layer
12 Space between the projection layers
17 Image
18 Image
20 Second metal film layer
21 Substrate sheet
28 Cover layer
31 Screen layer
36 Area intended to be decorated
40 First metal film layer
41 Substrate sheet
51 Transparent resin layer
60 Transfer device
61, 62 Thermo-compression roll
63 Transparent resin plate
101 Decorated molded article
102 Third decorated sheet

MOST PREFERRED EMBODIMENT TO CARRY OUT THE INVENTION

Referring to drawings, a decorated molded article of the present invention and a method of producing the decorated molded article will be described in detail by the following examples. Unless otherwise specifically stated, members, measurements, materials, shapes, relative positions and the like are merely examples for explanation and are not intended to restrict the scope of the present invention hereto. Unless otherwise explained, "parts" are by weight.

First, the decorated molded article of the present invention will be explained. FIG. 1 is a partial sectional view showing the decorated molded article 1 according to one embodiment of the present invention. A transparent resin layer 51 of the decorated molded article 1 of the present invention has a projection layer 11 partly arranged on the front side thereof. A screen layer 31 is formed on an area intended to be decorated (indicated by an arrow 36a in the figure) of the back side of the transparent resin layer 51. An arrow 8 shows the direction of observing the decorated molded article 1. In other words, the decorated molded article 1 is observed from high to down in FIG. 1.

The projection layer 11 is partly formed. In other words, it is formed as a plane pattern having spaces. Desired patterns may be used for the projection layer 11. As examples of the desired patterns, characters, geometric patterns, wood grain patterns, marble grain patterns, blanket texture patterns may be exemplified. These patterns can be formed either positively or negatively.

In contact with or in the vicinity of the projection layer 11, a hard coat layer, a peeling layer, a substrate sheet, an adhesion layer and the like may be laminated on the front side. In contact with or in the vicinity of the projection layer 11, a hard coat layer, a peeling layer, a substrate sheet, an adhesion layer and the like may be laminated on the side of the transparent resin layer. Furthermore, in contact with or in the vicinity of the screen layer 31, a hard coat layer, a peeling layer, a substrate sheet, an adhesion layer, a front anchor layer, a back anchor layer, an overcoat layer and the like may be laminated on the back side. Furthermore, in contact with or in the vicinity of the screen layer 31, a hard coat layer, a peeling layer, a substrate sheet, an adhesion layer, a front anchor layer, a back anchor layer, an overcoat layer and the like may be laminated on the side of the transparent resin layer.

These additional layers are composed of transparent materials. Consequently, in some cases these additional layers are included in the transparent resin layer 51 of the present invention.

Figure 2:
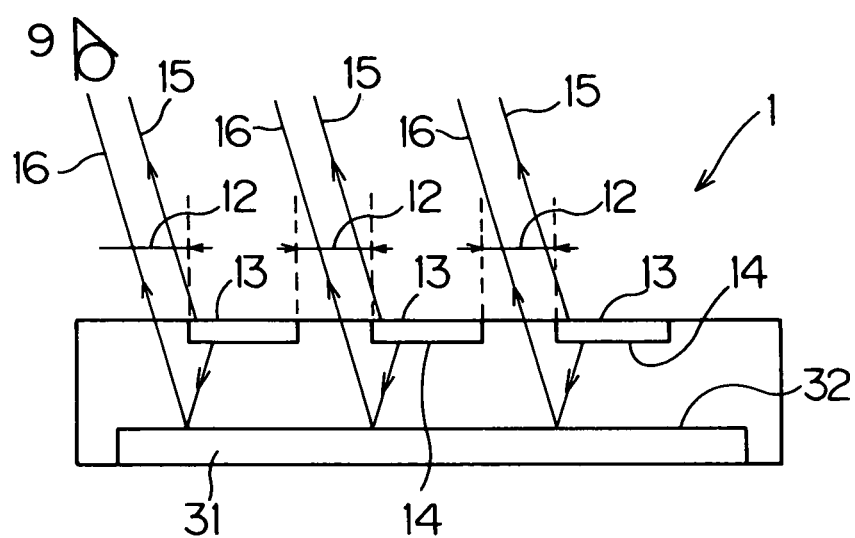
FIG. 2 is a partial sectional view showing an image projected to the screen layer 31 of the decorated molded article 1.

FIG. 2 is a partial sectional view showing images projected to the screen layer 31 of the decorated molded article 1. In FIG. 2, the same reference numerals as in FIG. 1 each are given to the same parts and members as in FIG. 1. When the decorated molded article 1 is observed from obliquely above (an observer's eye 9), part of the screen layer 31 can be seen through a space 12 between the projection layers 11. Light shown as arrows 16 from the back side 14 of the projection layer 11 is reflected by the front side 32 of the screen layer 31 and then reaches the observer's eye 9. At the same time, light shown as arrows 15 from the front side 13 of the projection layer 11 reaches the observer's eye 9.

The light shown the arrows 15 recognized visually and directly from the front side 13 of the projection layer 11 and the light shown the arrows 16 (an image) projected from the back side 14 of the projection layer 11 and reflected by the surface 32 of the screen layer 31 are both simultaneously observed. As a result, the surface of the projection layer 11 and the image are observed. Here the image needs to be visually recognized as distinguished from the surface of the screen layer 31. Therefore, the color tone of the projection layer 11 differs from that of the screen layer 31.

Figure 3:
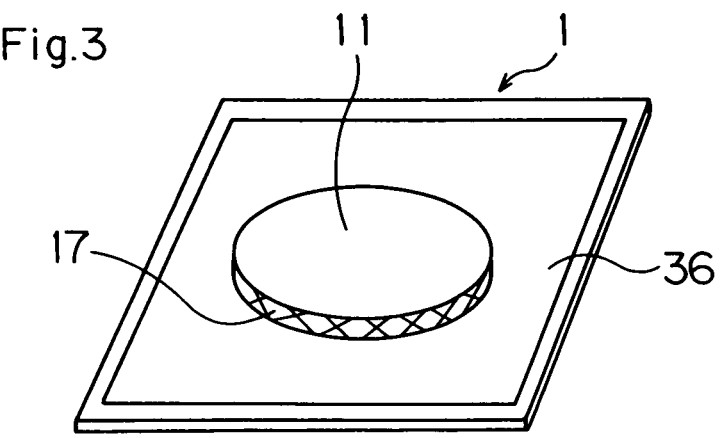
FIG. 3 is an external diagrammatic sketch of the decorated molded article 1.

FIG. 3 is an external diagrammatic sketch of the decorated molded article 1. The screen layer 31 is formed on the area intended to be decorated 36. An image 17 of the projection layer 11 formed in a circular pattern on the decorated molded article 1 is produced on the screen layer 31. When the decorated molded article 1 is observed from obliquely above, the projection layer 11 and the image 17 are visually and simultaneously recognized, leading to the projection layer 11 being recognized as if it were a three-dimensional image. Since the image 17 is different in width depending on the observation angle, it enhances the design effect.

In general, the projection layer 11 is composed of opaque materials to project an image on the screen layer 31. Preferably the projection layer 11 is composed of a material in which 100 parts of binder such as resin and equal to or more than 1 parts of pigment are mixed. In such range, an image that is projected from the projection layer and then produced on the screen layer 31 is easier to recognize visually.

As a pigment, one kind chosen from among an organic pigment, inorganic pigment, and body pigment may be used, or the mixture of two or three kinds of them may be used. Other pigments than such organic pigment, inorganic pigment, and extender may be also used alone or by mixture with such pigments. Pigments, unlike dyes, are insoluble in a binder and the like. There is a less amount of pigment that is added to binders to gain the same coloration effect, compared with dyes. In other words, formation of the projection layer 11 using paint and/or ink to which a pigment is added makes it possible to make a film of the projection layer 11 thinner, compared with formation of the projection layer 11 using paint or ink to which a dye is added.

As organic pigments, for example, disazo yellow, condensed azo, brilliant scarlet, phthalocyanine blue, and isoindoline can be used. As inorganic pigments, for example, carbon black, titanium oxide, and iron oxide can be used. Extenders mean white pigments with low refractive index that are used for strengthening a painting film or for extending. As extenders, for example, calcium carbonate and quartz can be used.

As resins used as a binder, there are acryl-based resin, vinyl chloride-based resin, vinyl chloride-vinyl acetate copolymerization-based resin, EVA-based resin, urethane-based resin, polyacetate-based resin, chlorinated polypropylene-based resin and the like.

It is easy and also preferable to form the projection layer 11 (or a projection layer 11 before transfer to be formed on a first decorated sheet or a third decorated sheet) by printing. As methods for printing, a gravure print method, an offset print method, a screen print method, a flexographic print method and the like can be used. The thickness of the projection layer 11 after printing is not restricted, however, preferably from 0.5 μm to 20 μm. In this range, the printing precision can be adequately kept, and there are less problems of projection layers 11 dropping off because of scratching and the like.

The projection layer 11 may be formed in two or more layers.

Transparent resin with a light transmission of equal to or more than 80% is preferable as a material of the transparent resin layer 51. Resin may be either colorless and transparent or colored and transparent. In this range of light transmission, light is less likely to scatter within the transparent resin layer 51 before the light from the projection layer 11 reaches the screen layer 31, and the light from the projection layer 11 effectively produces an image on the screen layer 31, which situation is preferable for design. "Light transmission" means ratio of the total transmitted light beam of a sample to the parallel injected light beam, indicating transparency of a substance. It is measured according to JIS K 7361-1 (1997).

As materials for the colorless transparent resin layer 51, for example, acryl-based resin, fluorine-based resin, polycarbonate-based resin, polyester-based resin, polystyrene-based resin, acrylonitrile-butadiene-styrene-based resin, polypropylene-based resin, polyacrylonitrile-based resin, polyamide-based resin, urethane-based resin, and vinylester-based resin can be used. Materials for the transparent resin layer 51 may be selected in terms of shape, required resistance properties and the like. For example, acryl-based resin may be used for automobile interior parts and the like, which require strong light resistance, high surface hardness and the like, and polycarbonate-based resin may be used for mobile phone enclosures, and the like, which require strong shock resistance and the like when falling.

When a colored transparent resin layer is used as the transparent resin layer 51, the colorless transparent resin materials mentioned above may be mixed with a dye and the like.

The thickness of the transparent resin layer 51 is equal to or more than 0.5 mm, preferably equal to or more than 0.7 mm, more preferably equal to or more than 1.0 mm. Within this range, an image of the projection layer 11 of the present invention is visually recognized in an appropriate width (apparent horizontal distance), hence producing a three-dimensional appearance favorably. The upper limit of the thickness of the transparent resin layer 51 is not restricted, but preferably 3.0 mm, more preferably 2.0 mm.

In general, the thickness of conventional decorated molded articles manufactured using the simultaneous decorating and molding method is about 1.0 to 2.0 mm. The decorated molded article of the present invention having the transparent resin layer 51 with a thickness of from 1.0 mm (including) to 2.0 mm (including) may be suitably and more preferably produced using the simultaneous decorating and molding method.

However, the thickness of the transparent resin layer 51 may be also more than 3.0 mm. Furthermore, there may be existed a structure of a decorated molded article and the like on the under surface of the screen layer.

In FIG. 1, the thickness of the transparent resin layer 51 (an arrow 52) means the distance between the back side 14 of the projection layer 11 and the front side 32 of the screen layer 31.

The screen layer 31 is a layer onto which an image of the projection layer 11 is projected. As screen layers 31, layers having a metallic surface, highly bright (white, yellow, pink, etc.) colored surface, pearly luster surface and the like may be adopted. Layers having a metallic surface, which form a clear image, are suitable for creating a three-dimensional appearance. On the other hand, layers having a highly bright (white, yellow, pink, etc.) colored surface or a pearly luster surface, which form an unclear image, are suitable for creating a soft or delicate three-dimensional appearance.

A metal film layer as the screen layer 31 may be formed by a vacuum evaporation method, a spattering method, an ion plating method and the like. As metals used, there are aluminum, chrome, indium, tin, nickel, gold, silver, copper, platinum, alloys of some of these metals and the like. These may be laminated directly or via an adhesive anchor layer on the resin layer. A metal film formed like this may be also transferred to the surface of a transparent resin layer by a transferring method, a hot stamping method and the like.

A metal film layer as the screen layer 31 may be formed by plating. As materials for plating, for example, chrome, nickel, copper, gold, silver, and palladium may be used.

As ink and paints (which form the screen layer 31) containing high intensity pigments, such as polarized flake pigment and pearl pigment, and colored pigments having highly bright color (white, yellow, pink, etc.), for example, ink and paints in which the pigments mentioned above are contained alone or by mixture thereof in a binder can be used. As polarized flake pigments, there are aluminum, mica and the like; however, in order to obtain clearer images, ink and paints of so-called leafing type, where polarized flake pigments are arranged in parallel and in piles on the surface layer of a painted film, may be preferably used. When the specular glossiness declines as a result of ink and paints containing only pigments having highly bright color (white, yellow, pink, etc.) being used as a material, high intensity pigments such as polarized flake pigment and pearl pigment may be added to such material.

As binder resins for ink and paints used as materials of the screen layer 31, for example, acryl-based resin, urethane-based resin, polyester-based resin, epoxy-based resin, vinyl-based resin, nitrocellulose-based resin, and chlorinated rubber-based resin can be used.

The screen layer 31 may be faintly colored by laminating optical transparent colored layers on the transparent resin layer 51's side of a layer formed from the metal film mentioned above or a layer formed from ink and paints containing high intensity pigments. The screen layer 31 may be also faintly colored by mixing colored pigments or dyes with ink and paint containing high intensity pigments. In order to form the screen layer 31 (or a screen layer 31 before transfer to be formed on a second decorated sheet and a fourth decorated sheet), the ink and paint may be laminated by a printing method, a coating method or a painting method. As methods for printing, a gravure printing method, an offset printing method, a screen printing method, a flexographic printing method and the like may be used.

From the viewpoint of ease to use and environmental friendliness, it is preferable to prepare the screen layer 31 by using a transfer method by which the screen layer 31 is formed (preparing a decorated sheet) on a substrate film such as polyethylene terephthalate stable in measurement before being transferred to the surface of the transparent resin by pressuring under heating.

Specular glossiness Gs of 60° according to JIS-Z8741 (1987) may be used to evaluate function of the screen layers. For the screen layer 31, it is preferable that the surface facing the transparent resin layer 51, that is to say, the surface 32, has a specular glossiness Gs (60°) of equal to or more than 80 according to JIS-Z8741 (1987). Within this range, an image projected is clearer and consequently easier to recognize visually.

Three-dimensional appearance was visually evaluated with respect to the decorated molded article 1, in which evaluation a percentage of compounded pigments (materials of the projection layer 11), light transmission of the transparent resin layer 51, and specular glossiness of the screen layer 31 were changed (Table 1).

TABLE 1

| Compounded pigments (/100) | Projection layer Transparent resin layer Light transmission (%) | Screen layer Specular glossiness Gs (60°) | Appearance Three-dimensional appearance |
|---|---|---|---|
| 0.5 | 70 | 50 | X |
|  |  | 80 | Δ |
|  |  | 120 | Δ |
|  | 80 | 50 | X |
|  |  | 80 | Δ |
|  |  | 120 | Δ |
|  | 90 | 50 | X |
|  |  | 80 | Δ |
|  |  | 120 | Δ |
| 1.0 | 70 | 50 | X |
|  |  | 80 | Δ |
|  |  | 120 | Δ~○ |
|  | 80 | 50 | X |
|  |  | 80 | ○ |
|  |  | 120 | ○ |
|  | 90 | 50 | X |
|  |  | 80 | ○ |
|  |  | 120 | ◎ |
| 1.5 | 70 | 50 | X |
|  |  | 80 | Δ |
|  |  | 120 | Δ~○ |
|  | 80 | 50 | X |
|  |  | 80 | ○ |
|  |  | 120 | ○ |
|  | 90 | 50 | X |
|  |  | 80 | ○ |
|  |  | 120 | ◎ |
|  | 90 | 50 | X |
|  |  | 80 | ◎ |
|  |  | 120 | ◎ |

The evaluation was made by observing the condition of three-dimensional effect according to the following evaluation standards judged by naked eyes:
◎ very stereoscopic,
○ stereoscopic
Δ stereoscopic, but less effective
x not stereoscopic.

From the evaluation results of Table 1, for the decorated molded article 1 of the present invention, it is more preferable that (1) the surface facing the transparent resin layer of the screen layer has a specular glossiness Gs (60°) of equal to or more than 80 according to JIS-Z8741 (1987), (2) the transparent resin layer has a light transmission of equal to or more than 80%, and (3) the projection layer is composed of materials containing equal to or more than 1 part by weight of pigments for 100 parts by weight of a binder.

For the decorated molded article 1 described above, the projection layer 11 may be described as a design layer, and the screen layer 31 may be described as a luster layer.

Figure 4:
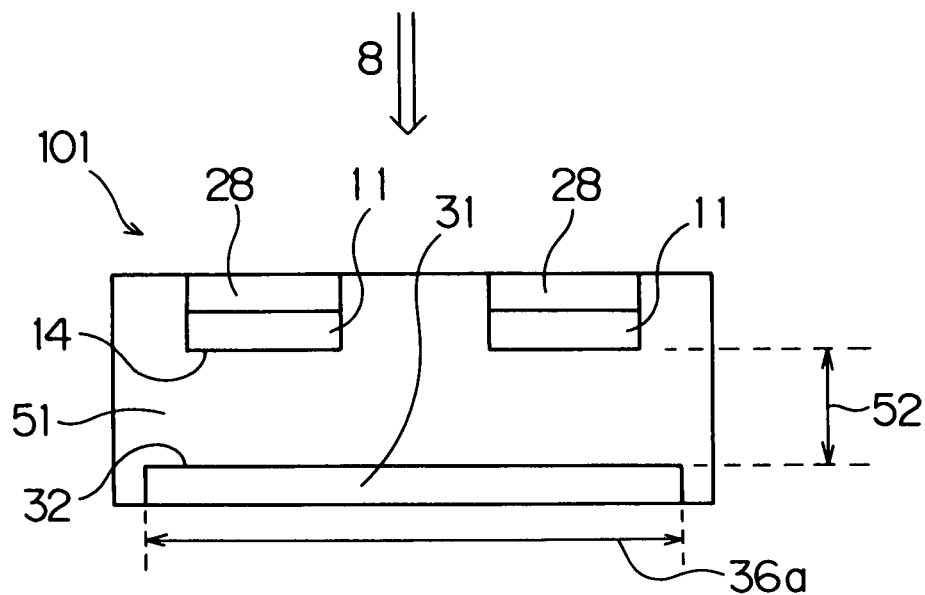
FIG. 4 is a partial sectional view showing a decorated molded article 101 according to another example of the present invention.

FIG. 4 is a partial sectional view showing a decorated molded article 101 according to another example of the present invention. The decorated molded article 101 of the present invention has the projection layer 11 partly arranged on the front side of a transparent resin layer 51. A cover layer 28 is formed on the front side of each projection layer 11 so that it can veil the projection layer 11. The screen layer 31 is formed on the area intended to be decorated (indicated by an arrow 36a in the figure) of the back side of the transparent resin layer 51. The cover layer 28 takes on the same color as that of the surrounding.

An arrow 8 shows the direction of observing the decorated molded article 101. That is to say, the decorated molded article 101 is observed from high to down in FIG. 4. The transparent resin layer 51 is piled on the screen layer 31 around the cover layer 28. Consequently, the color around the cover layer 28 is a color of the screen layer 31 observed through the transparent resin layer 51 in such state that the transparent resin layer 51 is piled on the screen layer 31.

The decorated molded article 101 has the same composition that the decorated molded article 1 has, except that the cover layer 28 is added. The transparent resin layer 51 and screen layer 31 of the decorated molded article 101 are composed of the same material and formed by the same method as used for the decorated molded article 1. The same holds true for the preferred materials and method for forming. In the following explanation about the decorated molded article 101, chiefly differences between it and the decorated molded article 1 will be described.

The projection layer 11 of the decorated molded article 101 may be either:

(1) a layer that, like the projection layer of the decorated molded article 1, for itself projects an image on the screen layer; or (2) a layer that projects an image on the screen layer in conjunction with the cover layer 28.

In the case of (1), the projection layer 11 of the decorated molded article 101 is composed of the same materials and formed by the same method as used for the projection layer of the decorated molded article 1. The same holds true for the preferred materials and method for forming.

To put the case (2) differently, one example is that the light projected from the projection layer itself is enhanced by the addition of the light which is emitted from the projection layer and then reflected by the cover layer, and another example is that the light projected from the projection layer itself is changed by the addition of the light which is transmitted through the cover layer.

In the case of (2), the materials of the projection layer 11 of the decorated molded article 101 and methods for forming of the projection layer 11 are not restricted. Therefore, the projection layer may be formed by the same method using the same material as used for a design layer of conventional decorated molded articles. In the case of both (1) and (2), an image that is projected from the projection layer and produced on the screen layer needs to be visually recognized as distinguished from the surface of the screen layer 31.

Figure 5:
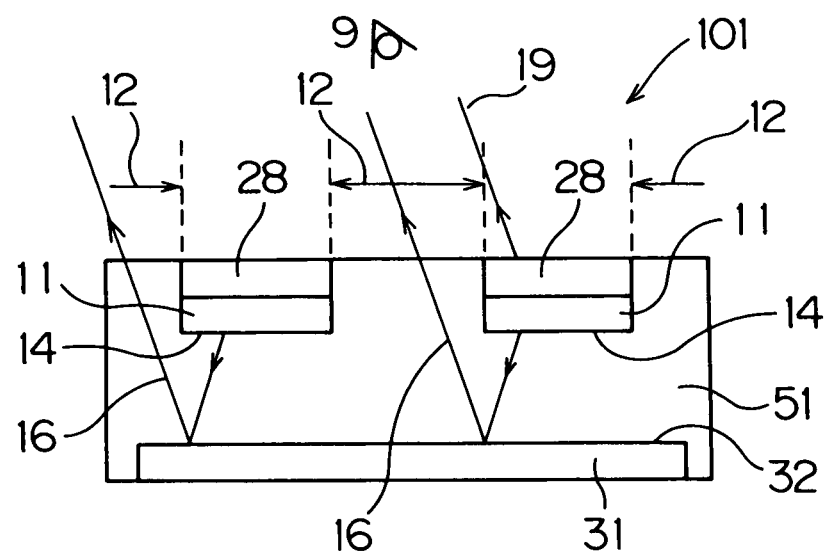
FIG. 5 is a partial sectional view showing an image projected to the screen layer 31 of the decorated molded article 101.

FIG. 5 is a partial sectional view showing an image projected to the screen layer 31 of the decorated molded article 101. In FIG. 5, the same reference numerals as in FIG. 4 each are given to the same parts and members as in FIG. 4. When the decorated molded article 101 is observed from obliquely above (an observer's eye 9), part of the screen layer 31 can been seen through a space 12 between the projection layers 11. Light shown as arrows 16 projected from the back side 14 of the projection layer 11 is projected on the front side 32 of the screen layer 31 and then reaches the observer's eye 9.

Light that goes from the projection layer 11 directly to the observer's eye 9 is completely blocked by the cover layer 28 or most of the light is blocked by the cover layer 28. As shown by arrows 19, light from the surface of the cover layer 28 reaches the observer's eye 9. The cover layer 28 has the same color as that of the surrounding, that is to say, the color of the screen layer 31 observed through the transparent resin layer 51. Therefore, when observed from the observer's eye 9, the surface of the decorated molded article is visually recognized in a way that there exists an image that is projected from the projection layer 11 and then produced on the area composed of the cover layer 28 and the screen layer 31, which are not differentiated.

Said image is seen or hidden and looks different in width, depending on the position of the observer's eye (an angle between the decorated molded article and the observer's eye), which phenomenon provides visual effect.

The cover layer 28 covers the whole area of the projection layer 11. A pair of the cover layer 28 and the projection layer 11 that are piled may be also formed in register (i.e., keeping the outlines aligned). This formation broadens a visual observation angle at which the image is observable. Consequently, even when the transparent resin layer is small in thickness, a three-dimensional appearance can be easily obtained.

On the other hand, a pair of the cover layer 28 and the projection layer 11 may be also arranged in a way that the cover layer 28 is placed on the projection layer 11, with the outline of the cover layer 28 being outside that of the projection layer 11 to a certain distance. In the case of the transparent resin layer 51 having a relatively large thickness, an image of part of the projection layer 11 inside the outline of the cover layer 28 is observable. Therefore, there are some cases in which a three-dimensional appearance can be created to a sufficient degree even if the cover layer 28 and the projection layer 11 are out of register.

Said certain distance may be different from pair to pair of the cover layer 28 and the projection layer 11 that are piled, or may be the same. Therefore, said constant distance may be freely decided. However, preferably the upper limit is 2 mm, more preferably 1 mm, most preferably 0.5 mm. The lower limit may be more than 0 mm.

When the outline of the projection layer 11 is more than such certain distance apart from the outline of the cover layer 28 toward the center, an image that is projected from such distant part of the projection layer 11 and then produced on the screen layer, is blocked by the cover layer and, therefore, is not observable to the observer's eye. Consequently, a projection layer 11 having a relatively large area does not need to be colored at its center area, and furthermore, it needs no projection layer at its center area.

From the viewpoint of ease to obtain a three-dimensional appearance even in the case of the transparent resin layer being small in thickness, preferably a pair of the cover layer 28 and the projection layer 11 that are piled is formed in register.

A front anchor, a back anchor and the like may be arranged in contact with the cover layer 28. On the front side of the cover layer 28 and the back side of the screen layer 31 (that is to say, the front and back sides of the decorated molded article 101) may an overcoat layer and/or a peeling layer be arranged, or may a substrate sheet be arranged.

Between the front side of the projection layer 11 and the back side of the cover layer 28 may a front anchor layer, a back anchor layer, an adhesion layer and the like be arranged, or may a transparent resin layer be also arranged.

The cover layer 28 may be either:

(1) a cover layer that almost completely blocks light from the projection layer 11 and that itself takes on the same color as that of the surrounding; or (2) a cover layer that transmits light from the projection layer to a certain degree and the light transmitted from the projection layer and a color emitted from the cover layer jointly take on the same color as that of the surrounding.

In the case (2), the color of the cover layer is mixed with the color of the projection layer, resulting in the area covered by the cover layer taking on the same color of the surrounding area.

The case (2) is applied only to the case where a pair of cover layer and projection layer is formed in register.

The cover layer may be formed, using the same materials and by the same method as described in the explanation about the formation of the screen layer of the decorated molded article 1. The cover layer 28 of the decorated molded article 101 may be formed, using the same materials as used for the screen layer 31, for instance. As specific examples of a decorated molded article 101 having the cover layer 28 composed of the same materials as used for the screen layer 31, there are a decorated molded article 101 having both layers composed of a metal film, a decorated molded article 101 having both layers composed of highly bright colored ink having pearly luster, and a decorated molded article 101 having both layers composed of ink having metallic luster.

FIG. 6 is an external diagrammatic sketch showing how the decorated molded article 101 is seen. The decorated molded article 101 in the figure has the projection layer 11 and the cover layer 28 that are both formed in the shape of circle. FIG. 6(*a*) is an external diagrammatic sketch showing how the decorated molded article 101 is seen from obliquely above. The screen layer 31 is formed on an area intended to be decorated 36. An image 18 of the projection layer 11 is observed, thereby giving a three-dimensional appearance to the decorated molded article 101. Furthermore, since the image 18 is different in width depending on the angle of observation, there is an increasing effect of design. FIG. 6(*b*) is an external diagrammatic sketch showing how the same decorated molded article 101 is seen from directly above. In this case, the image 18 is not observed. Furthermore, the cover layer 28 and the screen layer 31 are not distinguished, and the decorated molded article 101 looks as if it had no pattern.

If a colored transparent resin layer is used as the transparent resin layer 51 and the cover layer 28 takes on the same color as that of the screen layer observed through said colored transparent resin layer, when the decorated molded article 101 is observed from directly above, it is seen flat, and when observed from obliquely, the image 18 can be seen. As an example of the decorated molded article 101 having the colored transparent resin layer 51, there is a decorated molded article having the screen layer 31 and the cover layer 28 both composed of the same material, with a colored transparent resin layer composed of the same material as that for the colored transparent resin layer 51 being arranged on the cover layer 28.

For the decorated formed article 101 described above, the projection layer 11 may be described as a colored layer, the cover layer 28 may be described as a first reflection layer, and the screen layer 31 may be described as a second reflection layer.

Next, one method for producing the decorated molded article 1 of the present invention will be described. FIG. 7 is a sectional view showing an example of a mold used for producing the decorated molded article 1 of the present invention. The decorated molded article 1 is produced as follows. A first decorated sheet 2 having the projection layer 11 partly arranged on the substrate sheet 21 is arranged on the A mold 6's side. A second decorated sheet having the metal film layer 40 (screen layer) formed on the substrate sheet 41 is arranged on the B mold 7's side. The A mold 6 and the B mold 7 are clamped, and molten resin, which becomes a transparent layer after being solidified, is injected. Then, the molded article is cooled and solidified, and the molds are opened to take out the decorated molded article. The screen layer of the decorated molded article 1 according to the example is the first metal film layer 40.

In other words, by the simultaneous molding and decorating method, the projection layer 11 patterned and the screen layer (the first metal film layer 40) are formed on the front side and the back side of the decorated molded article 1, respectively, concurrently with the molding being conducted. Therefore, the decorated molded article 1 is obtainable in almost the same process as conventional one for simultaneous molding and decorating.

An example of the first decorated sheet 2 that is arranged on the A mold 6's side will be described. FIG. 8 is a sectional view showing the first decorated sheet 2. The first decorated sheet 2 is composed as follows. The peeling layer 23, the projection layer 11 partly formed, and the adhesion 24 are laminated in order on the substrate sheet 21 having the releasing layer 22 formed thereon.

The first decorated sheet 2 is adhered to the molded resin. Then, the substrate sheet 21 and the releasing layer 22 are peeled. Finally, there is obtained the decorated molded article 1 having the peeling layer 23, the projection layer 11 partly formed, and the adhesion layer 24 formed on the transparent resin. When the substrate sheet 21 has a releasing property, the releasing layer 22 may be omitted. The projection layer 11 is formed by a gravure printing method, an offset printing method, a screen printing method, a flexographic printing method and the like, using materials (ink, etc.) for forming of the projection layer 11 mentioned above.

Figure 9:
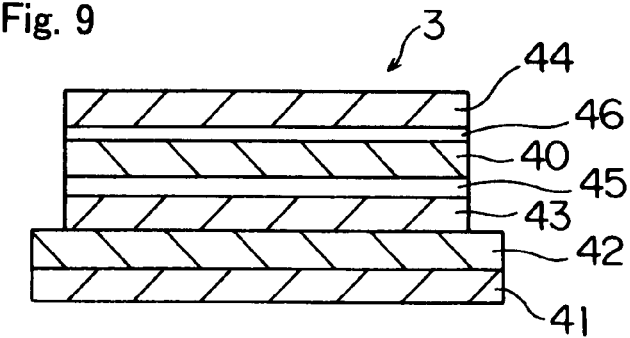
FIG. 9 is a sectional view showing the second decorated sheet 3.

An example of the second decorated sheet 3 that is arranged on the B mold 7's side will be described. FIG. 9 is a sectional view showing the second decorated sheet 3. The second decorated sheet 3 is configured as follows. The peeling layer 43, the first metal layer 40, and the adhesion layer 44 are laminated on the substrate sheet 41 having the releasing layer 42 formed thereon. The front anchor layer 45 is formed on the under surface of the first metal layer 40, and the back anchor 46 is formed on the upper surface of the first metal layer 40.

The second decorated sheet 2 is adhered to the molded resin. Then, the substrate sheet 41 and the releasing layer 42 are peeled. Finally, there is obtained the decorated molded article 1 having the peeling layer 43, the first metal layer 40 formed on the whole area, and the adhesion layer 44 formed on the molded resin. The first metal layer 40 is formed by the methods mentioned above, using the materials mentioned above.

Members used for both the first decorated sheet 2 and the second decorated sheet 3 will be described. As raw materials for the substrate sheets 21 and 41, resin sheets such as polypropylene-based resin, polyethylene-based resin, polyamide-based resin, polyester-based resin, acryl-based resin, polyvinyl chloride-based resin, polycarbonate-based resin, polyurethane-based resin, polystyrene-based resin, acetate-based resin, and polyamide-based resin, metal foils such as aluminum foil and copper foil, cellulose sheets such as glassine, coated paper, and cellophane, the mixture thereof, and the like are preferably used.

Preferably the thickness of the substrate sheets 21 and 41 is from 5 µm to 5 mm. Within this range, the sheets have appropriate rigidity, which ensures the sheets to preferably support transfer layers such as the first metal film layer 40. Furthermore, such rigidity makes the sheets easy to handle. The substrate sheets 21 and 41, if necessary, may be treated for adhesion in advance on their surfaces on which a printing layer is formed, by a corona discharge treatment, a plasma treatment, a primer coat treatment and the like.

As raw materials for the releasing layers 22 and 42 and the pealing layers 23 and 43, acryl-based resin, vinyl-based resin, urethane-based resin, polyester-based resin, polypropylene-based resin, polyethylene-based resin, polystyrene-based resin, polycarbonate-based resin, vinylon-based resin, acetate-based resin, and polyamide-based resin and the like may be used. Appropriate materials are chosen from among them, depending on peeling properties from a releasing layer.

As methods for forming the releasing layers 22 and 42 and the pealing layers 23 and 43, a gravure printing method, a offset printing method, a screen printing method and the like may be used. A painting method, a dipping method, a reverse coater method and the like may be also used. Preferably the thickness of the releasing layers 22 and 42 and the peeling layers 23 and 43 is from 0.5 µm to 50 µm. Within this range, the releasing layers and the peeling layers have appropriate rigidity or peeling properties and are easy to dry after the layers are formed.

As raw materials for the adhesion layers 24 and 44, acryl-based resin, vinyl-based resin, urethane-based resin, polyester-based resin, polypropylene-based resin, polyethylene-based resin, polystyrene-based resin, polycarbonate-based resin, vinylon-based resin, acetate-based resin, and polyamide-based resin may be used. Appropriate materials are chosen from among them, depending on adhesion properties with molded resins.

As methods for forming the adhesion layers 24 and 44, printing methods such as a gravure method, an offset method, and a screen method may be used. Coating methods such as a gravure coat method, a reverse coat method, a roll coat method, a comma coat method, and a lip coat method may be also used. A painting method, a dipping method and the like may be also used. Preferably the thickness of the adhesion layers 24 and 44 is from 0.5 µm to 10 µm. Within this range, the adhesion layers have appropriate adhesion properties, and are easy to dry after the adhesion layers are formed.

The above explanation is about the transfer sheets that are used as the first decorated sheet and the second decorated sheet. Instead of the transfer sheets, an insert sheet having the substrate sheets 21 and 41 remaining on the molded resin layer after being adhered to the molded resin may be used as the first decorated sheet and/or the second decorated sheet to produce the decorated molded article 1. These insert sheets may be formed in the same way as the transfer sheet is done, except that the releasing layer and the peeling layer of said transfer sheets are omitted.

The transfer sheets and the insert sheets may be pre-formed by a mold press method, a pneumatic press method, a vacuum form method and the like before being arranged within a mold, or may be pre-formed by vacuum suction or other ways through a cavity in the mold before being clamped. Furthermore, for positioning of the sheets in the mold, a marking may be printed, or a positioning hole may be pierced by die cutting.

Next, one method for producing the decorated molded article 101 of the present invention will be described. The mold in FIG. 7 may be used also for producing of the decorated molded article 101 of the present invention. The decorated molded article 101 is produced as follows. A third decorated sheet 102 having the cover layer partly arranged on the substrate sheet and the projection layer formed on the upper surface of said cover layer is arranged on the A mold 6's side. A fourth decorated sheet having the screen layer formed on the substrate sheet is arranged on the B mold 7' side. The A mold 6 and the B mold 7 are clamped, and molten resin is injected. Then, the molded article is cooled and solidified, and the molds are opened to obtain the decorated molded article of the present invention.

For the decorated molded article 101 according to the example, the screen layer is the first metal film layer 40, and the cover layer is the second metal film layer 20.

In other words, by the simultaneous molding and decorating method, the projection layer partly formed and the cover layer (the second metal film layer 20) covering the whole projection layer are formed on the front side of the decorated molded article 101, and the screen layer (the first metal film layer 40) is formed on the back side, concurrently with the molding being conducted. Therefore, the decorated molded article 101 of the present invention is obtainable in almost the same process as conventional one for simultaneous molding and decorating.

Figure 10:
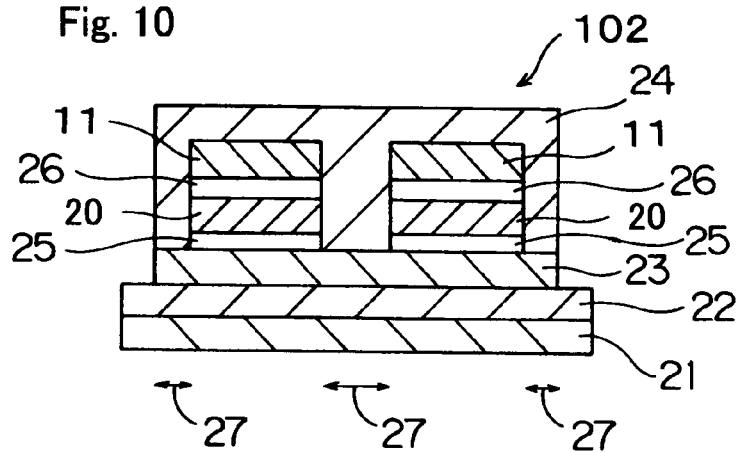
FIG. 10 is a sectional view showing the third decorated sheet 102.

An example of the third decorated sheet that is arranged on the A mold 6's side will be described. FIG. 10 is a sectional view showing the third decorated sheet 102. The third decorated sheet 102 is configured as follows. The peeling layer 23, the second metal film layer 20 partly formed, the projection layer 24 piled on the second metal film layer 20, and the adhesion 24 are laminated in order on the substrate sheet 21 having the releasing layer 22. The front anchor 25 is formed on the under surface of the second metal film layer 20, and the back anchor layer 26 is formed on the upper surface of the second metal film layer 20.

The third decorated sheet 102 is adhered to the molded resin. Then, the substrate sheet 21 and the releasing layer 22 are peeled. Finally, there is obtained the decorated molded article 101 having the adhesion layer 24, the projection layer 11 partly formed, the second metal film layer 20 covering the projection layer 11, and the peeling layer 23, all formed on the molded resin.

In order to arrange the second metal film layer 20 and the projection layer 11 in register, for example, a method described in Japanese Utility Model Laid-Open No. 53-21124 may be used. This method will be briefly explained as follows. First, the peeling layer 23 is formed. A soluble paint film layer is formed on the area (indicated by an arrow 27) of the peeling layer, on which area the second metal film layer 20 is not planed to form. Then the metal film layer, the projection layer and the like are formed in the whole decorated area. When the decorated sheet is rinsed in water, the soluble paint film layers are removed, and the metal film layer and the colored layer formed thereon are also removed. Consequently, there is obtained a colored sheet having the second metal film layer 20 and the projection layer 11 remained maintaining register only on the planed area. Finally, the adhesion layer 24 is formed by printing and the like to obtain the third decorated sheet 102.

As another methods for arranging the second metal film layer 20 and the projection layer 11 in register, there is the following method. First, the second metal film layer 20 is formed in a proper pattern, and then the projection layer 11 is printed in register on the second metal film layer.

The second metal film layer 20 of the third decorated sheet 102 may be formed by the same method and using the same materials as the first metal film layer 40 (i.e., screen layer) mentioned above is done. The projection layer 11 may be formed by the same method and using the same materials as the projection layer 11 of the first decorated sheet is done.

The fourth decorated sheet that is arranged on the B mold 7's side is the same as the second decorated sheet.

Layers that the third decorated sheet 102 has in common with the first decorated sheet 2 can be produced by the same method and using the same raw materials as for the first decorated sheet. This holds true for preferred method and raw materials for the third decorated sheet 102.

The above explanation is about the transfer sheets that are used as the third decorated sheet and the fourth decorated sheet. Instead of the transfer sheets, an insert sheet having the substrate sheets 41 and 21 remaining on the molded resin layer after being adhered to the molded resin may be used as the third decorated sheet and/or the fourth decorated sheet to produce the decorated molded article 101. These insert sheets may be formed in the same way as the transfer sheet is done, except that the releasing layer and the peeling layer of said transfer sheets are omitted.

The decorated molded article 101 may be produced in the same way as the decorated molded article 1 is done. The decorated sheet may be pre-formed. Furthermore, a marking may be printed, and a positioning hole may be pierced.

Figure 11:
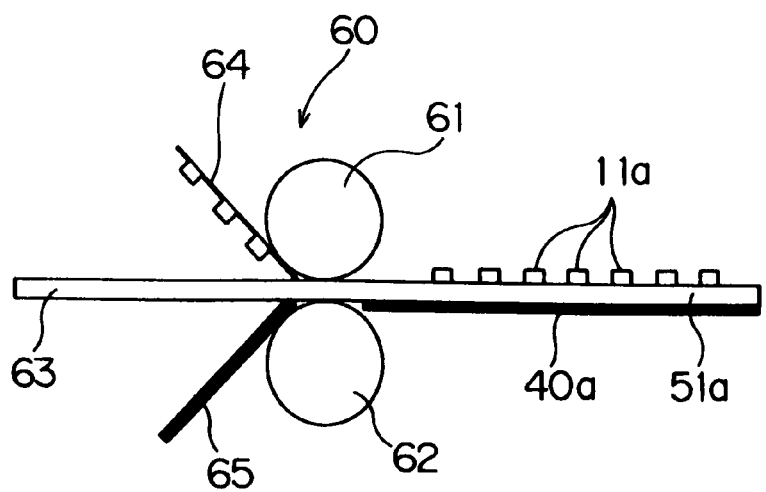
FIG. 11 is a sectional view showing an example of a transfer device used for producing of a decorated molded article of the present invention.

Next, another method for producing the decorated molded article 1 and the decorated molded article 101 of the present invention will be described. FIG. 11 is a sectional view showing an example of a transfer device used for producing a decorated molded article of the present invention.

A transparent resin plate 63, a decorated sheet 64, and a decorated sheet 65 are fed into between a heat press roll 61 and a heat press roll 62 of a transfer device 60. The decorated sheet 64 and the decorated sheet 65 are the same as the first decorated sheet (or the third decorated sheet) and the second decorated sheet (or the fourth decorated sheet) used for the simultaneous molding and decorating method described in FIGS. 7 to 10, respectively. Between the heat press roll 61 and the heat press roll 62, a projection layer, a metal film layer and the like on the decorated sheets 64 and 65 are transferred to both sides of the transparent resin plate 63. Then, a substrate sheet and the like are removed, and there is obtained a decorated molded article having a projection layer Ha partly formed on the front side of a transparent layer 51a and a first metal film layer 40a formed on the back side. The decorated molded article may be used as it is or after being cut to the length appropriate.

As methods for transfer, laminating methods such as an extrusion lamination method, a heat lamination method, and a hot stamp method may be used.

The above explanation is about the method of transferring the transfer sheets to both sides of the transparent resin plate. However the following methods may be adopted. That is, first, one side of the transparent resin plate is simultaneously molded and decorated by the simultaneous molding and decorating method, and then the other side is decorated by heat transfer and the like. Furthermore, with no decorated sheet being used, the front side of a transparent or colored resin may be directly printed to form a projection layer (and a cover layer) thereon, and the back side may be painted or plated to form a screen layer.

Among the methods for producing the decorated molded article 1 and the decorated molded article 101 described above, a method of transferring both sides simultaneously in the injection mold, that is, the simultaneous molding and decorating method, is most preferable from the viewpoint of reduction in man-hour and environmental protection.

EXAMPLE 1

A part for liquid crystal window to be used for mobile phones was produced in the following manner. A polyethylene terephthalate film (trade name: G600) (thickness: 38 μm) manufactured by Mitsubishi Polyester Film Corporation was used as a substrate sheet. A peeling layer, a project layer having a geometric pattern, and an adhesion layer were formed in order on the polyethylene terephthalate film by a gravure printing method to obtain a first decorated sheet. The first decorated sheet was a transfer sheet. Acrylic resin was used as a binder in the ink used to print the peeling layer, the project layer, and the adhesion layer. The thickness of the projection layer was 1.0 μm. The ink used for printing of the projection layer contained a mixture of 5 parts of black carbon as a pigment and 100 parts of binder.

The same polyethylene terephthalate film (thickness: 38 μm) as mentioned above was used as a substrate sheet. A peeling layer, an anchor layer, a first metal film layer, and an adhesion layer were formed in order on the polyethylene terephthalate film to obtain a second decorated sheet. The second decorated sheet was a transfer sheet. The first metal film layer, which was formed by vacuum evaporation using aluminum as material, had a specular glossiness Gs (60°) of 200. The peeling layer and the adhesion layer were formed by a gravure printing method, using acrylic ink, and the anchor layer was formed by a gravure printing method, using urethane ink.

The first decorated sheet was fed into an A mold's side and the second decorated sheet was fed into a B mold's side, both by using a feeder. After the mold was clamped, acrylic resin (trade name: IRH50) with a light transmission of 92% manufactured by Mitsubishi Rayon Co., Ltd. was injection molded and then unified with the first decorated sheet and the second decorated sheet. After that, the substrate sheet was peeled to obtain a decorated molded article. The thickness of the acrylic resin was 1.5 mm. The obtained part, that is, a decorated molded article, was so three-dimensional that a geometric pattern (projection layer) could be produced as an image on the metal film layer.

EXAMPLE 2

A center cluster part for automobile interior was produced in the following manner. An acrylic film (trade name: HBXN47) (thickness: 125 μm) manufactured by Mitsubishi Rayon Co., Ltd. was used as a substrate sheet. A project layer having a geometric pattern and an adhesion layer were formed on the acrylic film by a gravure printing method to obtain a first decorated sheet. The first decorated sheet was a transfer sheet. Acrylic resin was used as a binder in the ink used to print the projection layer. Vinyl chloride-vinyl acetate copolymerization-based resin was used as a binder in the ink used to print the adhesion layer. The thickness of the projection layer was 0.7 μm. The ink used for printing of the projection layer contained a mixture of 3 parts of titanium oxide as a pigment and 100 parts of binder.

The same polyethylene terephthalate film (thickness: 38 μm) as used in Example 1 was used as a substrate sheet. A peeling layer, a screen layer, and an adhesion layer were formed in order on the polyethylene terephthalate film to obtain a second decorated sheet. The second decorated sheet was a transfer sheet. The material for the screen layer was a high brightness aluminum pigment that was dispersed in an acrylic ink binder. The material for the peeling layer and the adhesion layer was acrylic ink. The peeling layer, the screen layer, and the adhesion layer were formed by a gravure printing method. The screen layer had a specular glossiness Gs (60°) of 95.

The first decorated sheet was fed into an A mold's side and the second decorated transfer sheet was fed into a B mold's side, both by using a feeder. After the mold was clamped, polycarbonate resin (tradename: Panlite) with a light transmission of 92% manufactured by Teijin Chemicals Ltd. was injection molded and then unified with the first decorated sheet and the second decorated sheet. After that, the substrate sheet was peeled to obtain a decorated molded article. The thickness of the polycarbonate resin was 2.0 mm. The obtained part, that is, a decorated molded article, was so three-dimensional that a geometric pattern (the projection layer) could be produced as an image on the metal screen layer.

EXAMPLE 3

A cosmetic front panel for refrigerators was produced in the following manner. An acrylic resin plate (trade name: Acryllite) (thickness: 3.0 mm) with a light transmission of 90% manufactured by Mitsubishi Rayon Co., Ltd. was provided in advance. Characters and the like as a projection layer were printed on the plate by a screen printing method. Ink containing a mixture of 10 parts of phthalocyanine blue and carbon black as a pigment and 100 parts of acrylic binder was used as ink for printing.

Then, a mixture of acrylic urethane binder and aluminum pigment was applied to the reverse side of the acrylic resin plate using a spray to form a screen layer. The specular glossiness Gs (60°) of the screen layer was 120.

The obtained decorated molded article was cut in the desired shape by an NC router to obtain a cosmetic front panel for refrigerators. The obtained cosmetic front panel for refrigerators was so three-dimensional that characters and the like (the projection layer) could be produced as an image on the screen layer.

EXAMPLE 4

A part for liquid crystal window to be used for mobile phones was produced in the following manner. A polyethylene terephthalate film (trade name: G600) (thickness: 38 μm) manufactured by Mitsubishi Polyester Film Corporation was used as a substrate sheet. A peeling layer, a front anchor layer, a second metal film layer having a geometric pattern as a cover layer, a back anchor layer piled on the second film layer, a projection layer, and an adhesion layer were formed in order on the polyethylene terephthalate film to obtain a third decorated sheet. The third decorated sheet was a transfer sheet. The peeling layer, the projection layer, and the adhesion layer were formed using acrylic ink, and the anchor layer was formed using urethane ink, both by a gravure printing method. The ink used for printing of the projection layer contained a mixture of 5 parts of carbon black as a pigment and 100 parts of binder. The second metal film layer was formed by vacuum evaporation using aluminum as material, and on part of the second metal film layer was a geometric pattern formed by a method mentioned in Japanese Utility Model Laid-Open No. 53-21124. The specular glossiness Gs (60°) of the second metal film layer surface was 200.

The peeling layer, the front anchor layer, the first metal film layer (the screen layer), and the adhesion layer were formed in order on the same polyethylene terephthalate film (thickness: 38 µm) as used above to obtain a fourth decorated sheet. The fourth decorated sheet was a transfer sheet. The composition, materials, and formation methods for each layer were the same as those for the third decorated sheet, except that no patterning was made on the geometric pattern. The specular glossiness Gs (60°) of the first metal film layer surface was 200.

The third decorated sheet was fed into an A mold side and the fourth decorated sheet was fed into a B mold's side, both by using a feeder. After the mold was clamped, acrylic resin (trade name: IRH50) with a light transmission of 92% manufactured by Mitsubishi Rayon Co., Ltd. was injection molded and then unified with the third decorated sheet and the fourth decorated sheet. After that, the substrate sheet was peeled to obtain a decorated molded article. The thickness of the acrylic resin was 1.5 mm.

No pattern was observed on the obtained decorated molded article, when observed from directly above. However, an image of the projection layer was observed on the obtained decorated molded article, when observed from obliquely above, because the projection layer covered by the cover layer was reflected on the front side of the screen layer. The decorated molded article was a product having so novel design that a three-dimensional appearance was observed clearly or disappeared, depending on the observation angle.

INDUSTRIAL APPLICABILITY

Decorated molded articles of the present invention are useful for automobile interiors and exteriors, electric appliances, mobile telephones, building materials and the like.

The invention claimed is:

1. A decorated molded article comprising:
a transparent resin layer,
a projection layer partly arranged on a front side of said transparent resin layer,
a screen layer arranged on an area intended to be decorated on a back side of said transparent resin layer and on which an image projected from said projection layer is produced,
a cover layer covers said projection layer and is formed on a front side of said projection layer, said cover layer is the same color on an area covered by said cover layer as a color of an area horizontally adjacent to the area covered by said cover layer,
a width of the said cover layer is equal to or greater than a width of said projection layer; and
said cover layer is arranged on an outermost side of said decorated molded article, wherein
the outermost side is opposite of a side of the molded article in which the screen layer is arranged,
the cover layer is designed such that it is visible from an external of said decorated molded article, and also is visible from a view point of said outermost side of said decorated molded article, and
the screen layer is designed such that a portion of the screen layer's that is not directly beneath said cover layer is visible from the external of said decorated molded article, and also is visible from the view point of said outermost side of said decorated molded article.

2. The decorated molded article according to claim 1, wherein said transparent resin layer is a colored and transparent resin layer.

3. A decorated molded article comprising:
a transparent resin layer;
a projection layer partly arranged on a front side of said transparent resin layer;
a screen layer arranged on an area intended to be decorated on a back side of said transparent resin layer and on which an image projected from said projection layer is produced;
a cover layer, the color of which mixed with the color of said projection layer, is the same color on the area covered by said cover layer as a color of an area horizontally adjacent to the area covered by said cover layer, is formed on a front side of said projection layer;
a width of the said cover layer is equal to or greater than a width of said projection layer; and
said cover layer is arranged on an outermost side of said decorated molded article, wherein
the outermost side is opposite of a side of the molded article in which the screen layer is arranged,
the cover layer is designed such that it is visible from an external of said decorated molded article, and also is visible from a view point of said outermost side of said decorated molded article, and
the screen layer is designed such that a portion of the screen layer's that is not directly beneath said cover layer is visible from the external of said decorated molded article, and also is visible from the view point of said outermost side of said decorated molded article.

4. The decorated molded article according to claim 3, wherein said transparent resin layer is a colored and transparent resin layer.

5. A method for producing a decorated molded article, wherein a first decorated sheet having a projection layer partly arranged on the substrate sheet is arranged on an A mold's side, a second decorated sheet having a screen layer formed thereon is arranged on a B mold's side, the A mold and the B mold are clamped, and molten resin, which becomes a transparent layer after being solidified, is injected, and then, the molded article is cooled and solidified, and the molds are opened to obtain the decorated molded article described in claim 1.

6. A method for producing a decorated molded article, wherein a third decorated sheet having a cover layer partly arranged on a substrate sheet and a projection layer formed in a pile on the upper surface of said cover layer is arranged on an A mold's side, a fourth decorated sheet having a screen layer formed on the substrate sheet is arranged on a B mold's side, the A mold and the B mold are clamped, and molten resin, which becomes a transparent layer after being solidified, is injected, and then, the molded article is cooled and solidified, and the molds are opened to obtain the decorated molded article described in claim 1.

* * * * *

UNITED STATES PATENT AND TRADEMARK OFFICE
CERTIFICATE OF CORRECTION

PATENT NO. : 8,703,279 B2  
APPLICATION NO. : 11/791112  
DATED : April 22, 2014  
INVENTOR(S) : Yoshikawa et al.

Page 1 of 1

It is certified that error appears in the above-identified patent and that said Letters Patent is hereby corrected as shown below:

Title Page, Item (12) delete "Fukada et al." and insert -- Yoshikawa et al. --.

Title Page, Item (75) Inventors should read

-- (75) Inventors: ~~Yasuhide Fukada, Kyoto (JP);~~ Kumiko Yoshikawa, Kyoto (JP); Nobuyasu Hirobe, Kyoto (JP); Shigeru Hinoshita, Kyoto (JP) --.

Signed and Sealed this  
Tenth Day of November, 2015

Michelle K. Lee  
*Director of the United States Patent and Trademark Office*